US009126478B2

(12) United States Patent
Lee et al.

(10) Patent No.: US 9,126,478 B2
(45) Date of Patent: Sep. 8, 2015

(54) ADAPTIVE OPEN LOOP CONTROL TO REDUCE ENGINE INDUCED VIBRATION AND NOISE

(71) Applicant: GM Global Technology Operations LLC, Detroit, MI (US)

(72) Inventors: Ping Lee, Kitchener (CA); John D. Sopoci, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 26 days.

(21) Appl. No.: 13/903,754

(22) Filed: May 28, 2013

(65) Prior Publication Data

US 2014/0358366 A1 Dec. 4, 2014

(51) Int. Cl.
| | |
|---|---|
| *G06F 7/00* | (2006.01) |
| *G05B 5/01* | (2006.01) |
| *B60K 5/12* | (2006.01) |
| *F16F 15/00* | (2006.01) |

(52) U.S. Cl.
CPC ............. *B60K 5/1283* (2013.01); *F16F 15/002* (2013.01)

(58) Field of Classification Search
USPC ............................................. 701/36; 318/611
See application file for complete search history.

(56) References Cited

U.S. PATENT DOCUMENTS

| | | | | |
|---|---|---|---|---|
| 7,242,567 | B2 * | 7/2007 | Nemoto ......................... | 361/152 |
| 7,403,367 | B2 * | 7/2008 | Yasuda et al. ................. | 361/139 |
| 7,923,955 | B2 * | 4/2011 | Shin et al. ..................... | 318/611 |
| 2006/0139840 | A1 * | 6/2006 | Yasuda et al. ................. | 361/143 |
| 2008/0106015 | A1 * | 5/2008 | Fushimi et al. ........... | 267/140.15 |
| 2012/0197490 | A1 * | 8/2012 | Muragishi et al. ............. | 701/37 |

FOREIGN PATENT DOCUMENTS

| | | |
|---|---|---|
| DE | 60210715 T2 | 9/2006 |
| DE | 102006014995 A1 | 10/2007 |
| DE | 102007042222 A1 | 3/2009 |
| DE | 102008035758 A1 | 3/2009 |
| DE | 112010002850 T5 | 7/2012 |

OTHER PUBLICATIONS

German Patent and Trade Mark Office, Office Action for German Patent Application No. 10 2014 208 621.3, mailed Dec. 10, 2014.

* cited by examiner

*Primary Examiner* — Thomas G Black
*Assistant Examiner* — Tyler Paige
(74) *Attorney, Agent, or Firm* — Ingrassia Fisher & Lorenz, P.C.

(57) ABSTRACT

Methods and systems are provided for controlling an active vibration system. In one embodiment, a method of controlling an active vibration system associated with an engine is provided. The method includes: receiving engine parameters indicating one or more engine operating conditions; determining an operating mode of the active vibration system to be at least one of a sensing mode and a force generation mode based on the engine parameters; and selectively controlling the active vibration system based on the operating mode.

20 Claims, 3 Drawing Sheets

ADAPTIVE OPEN LOOP CONTROL TO REDUCE ENGINE INDUCED VIBRATION AND NOISE

TECHNICAL FIELD

The technical field generally relates to control methods and systems for engine mount systems, and more particularly relates to open loop control methods and systems for engine mount systems.

BACKGROUND

Active vibration control systems are used to reduce or cancel noise and vibrations induced by internal combustion engines of vehicles. Active vibration control systems utilize active actuators, such as active engine mounts, to cancel the engine induced vibrations.

One such active engine mount comprises a spring-mass system such as an electromagnetic actuator having an electromagnet and piston. The electromagnetic actuator is electromagnetically driven and operable to generate a neutralizing force in response to forces transmitted to the chassis or body it is mounted on. However, in order to effectively cancel the transmitted or resultant forces, the neutralizing force must be tuned to the amplitude and frequency of the transmitted force. While numerous methods and apparatuses have been developed for generating such a neutralizing force, in all known developments, generating the neutralizing force is achieved independently. That is, independent mechanisms (e.g., additional sensors) are employed in order to tune the frequency of the neutralizing force to the frequency of the resultant forces (which is a function of the rotational speed of the crankshaft). Such independent mechanisms often require expensive and complex control units to effectively cancel engine induced forces.

Accordingly, it is desirable to provide improved methods and systems for controlling an active engine mount. In addition, it is desirable to provide methods and systems for controlling an active engine mount without the need for additional sensors. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for controlling an active vibration system. In one embodiment, a method of controlling an active vibration system associated with an engine is provided. The method includes: receiving engine parameters indicating one or more engine operating conditions; determining an operating mode of the active vibration system to be at least one of a sensing mode and a force generation mode based on the engine parameters; and selectively controlling the active vibration system based on the operating mode.

In another embodiment, an engine mount system is provided. The system includes an active vibration system; a switch associated with the active vibration system; and a control module. The control module determines an operating mode of the active vibration system to be at least one of a sensing mode and a force generation mode, and that generates a control signal to the switch based on the operating mode.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
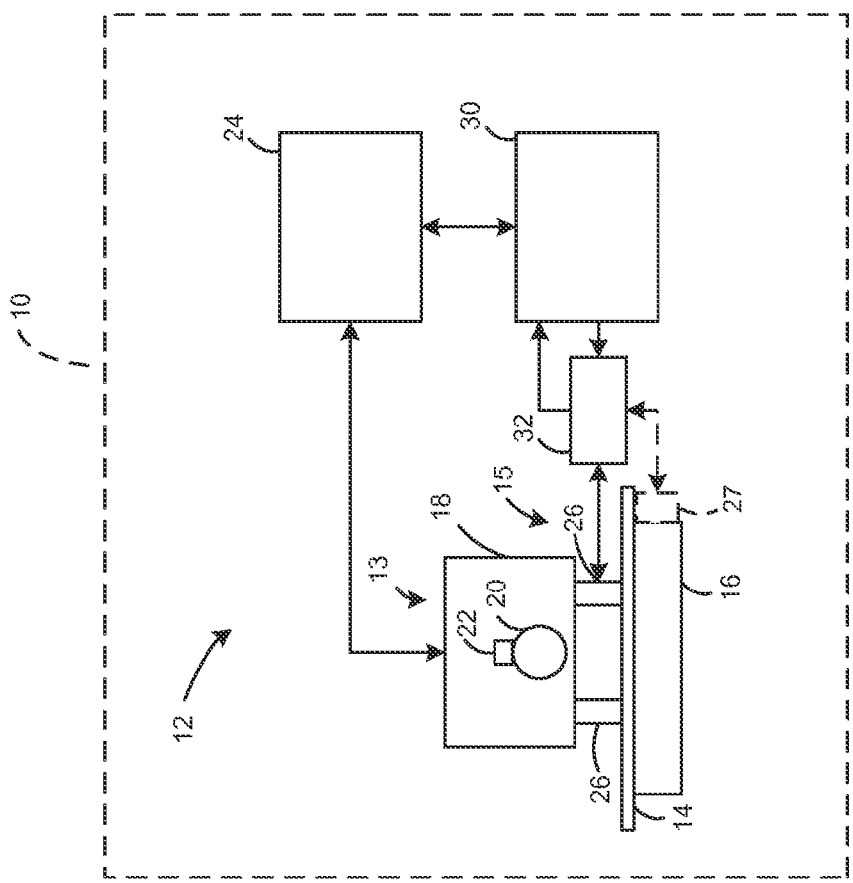
FIG. 1 is a functional block diagram of a vehicle that includes an engine mount system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 is shown to include an engine mount system 12 in accordance with various embodiments. Although the figures shown herein depict an example with certain arrangements of elements, additional intervening elements, devices, features, or components may be present in actual embodiments. It should also be understood that FIG. 1 is merely illustrative and may not be drawn to scale.

The vehicle 10 is shown having an internal combustion engine 13 mounted to a chassis/body member 14. The chassis/body member 14 is supported by a suspension system 16. Those skilled in the art will recognize that the suspension system 16 may include such components as springs, shock absorbers, tires, etc., which are not shown for purposes of clarity. The internal combustion engine 13 includes an engine block 18 configured to rotatably support a crankshaft 20. A sensor 22 operates to provide an observed crankshaft angle value to an engine control module 24. The engine control module 24 controls the internal combustion engine 13 based on the crankshaft angle and sensor signals received from other sensors (not shown) of the internal combustion engine 13.

An active vibration system 15 operates to cancel vibrations imparted to the chassis/body member 14 by the internal combustion engine 13. For example, the active vibration system 15 can include active engine mounts 26 that support the internal combustion engine 13 on the chassis/body member 14. Alternatively, the active vibration system 15 can include active tuned absorbers, shown in phantom at 27, that are coupled to the chassis/body member 14. As can be appreciated, the active vibration system 15 can include any active vibration system that includes, for example, an actuator having a moving mass surrounded by a coil, and is not limited to the present examples.

The active vibration system 15 is electronically controlled by a control module 30. A switch 32 is disposed between the active vibration system 15 and the control module 30. The switch 32 is controlled by the control module 30 to at least one of a first position and a second position. When controlled to the first position, the switch 32 permits control signals generated by the control module 30 to pass from the control module 30 to the active vibration system 15, to energize the active vibration system 15.

When controlled to the second position, the switch 32 permits current signals generated by the active vibration system 15 to pass from the active vibration system 15 to the control module 30. The current is generated, for example, by excitation of the moving mass that is induced by vibration and/or road input, when the active vibration system 15 is not energized. For example, the motion of the moving mass causes a magnetic flux through a surrounding coil that causes current in the coil. The current in the coil may be correlated with an engine inducted vibration level. The switch 32 permits flow of the current from the current coil to the control module 30, and thus the active vibration system 15 themselves act as sensors of the vibration imparted to the chassis/body member 14.

The control module 30 controls the switch 32 based on an operating mode of the active vibration system 15. As will be discussed in more detail below, the control module 30 determines the operating mode to be at least one of a sensing mode and a force generation mode based on engine parameters. The engine parameters may be received from sensors of the engine mount system 12 or from the engine control module 24.

When the control module 30 determines the operating mode to be the sensing mode, the control module 30 receives the current signal generated by the active vibration system 15. When the control module 30 determines the operating mode to be the force generation mode, the control module 30 generates control signals to the active vibration system 15 based on information determined from the received current signals. Thus, the control module 30 operates in an adaptive open loop mode.

Figure 2:
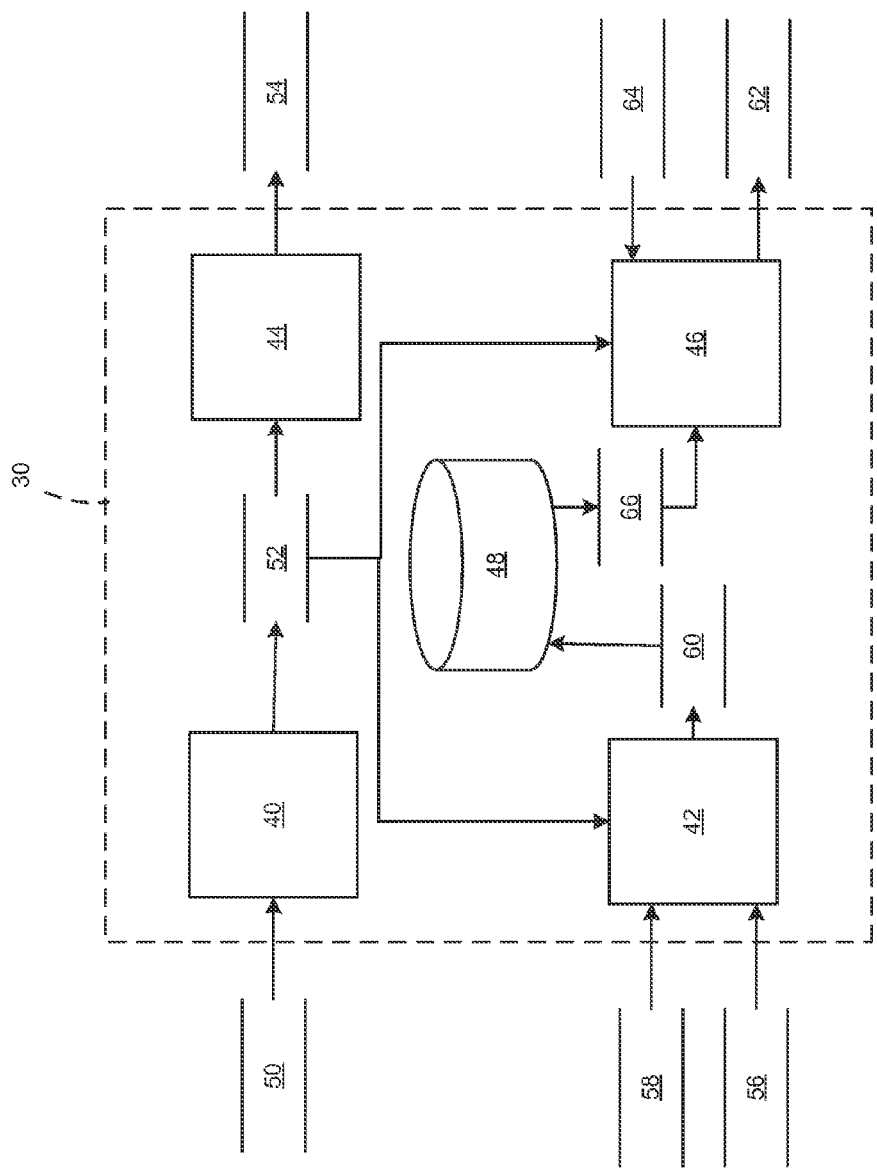
FIG. 2 is a functional block diagram of a control module of the engine mount system in accordance with various embodiments.

Referring now to FIG. 2 and with continued reference to FIG. 1, a functional block diagram illustrates various embodiments of the control module 30 of the engine mount system 12. Various embodiments of the control module 30 according to the present disclosure may include any number of sub-modules. As can be appreciated, the sub-modules shown in FIG. 2 may be combined and/or further partitioned to similarly control the active vibration system 15 based on adaptive open loop methods. Inputs to the control module 30 may be received from the active vibration system 15, received from other control modules (e.g., the engine control module 24) of the vehicle 10, and/or determined by other sub-modules (not shown) of the control module 30. In various embodiments, the control module 30 includes a mode determination module 40, an adaptation module 42, a switch control module 44, an active vibration control module 46, and a tables datastore 48.

The tables datastore 48 stores one or more tables (e.g., lookup tables) that indicate a force for controlling the active vibration system 15. In various embodiments, the tables can be interpolation tables that are defined by one or more indexes. A force value provided by at least one of the table indicates an amount of force needed to suppress or cancel a vibration level of the internal combustion engine 13. For example, one or more tables can be indexed by engine parameters such as, but not limited to, engine crank position, engine speed, engine torque, gear state, and engine temperature and can provide a vibration level. In addition, at least one table can be indexed by the vibration level and can provide the force value. Thus, the force value indicates an amount of force needed to suppress or cancel a particular vibration level generated at particular engine crank position, engine speed, engine torque, gear state, and engine temperature.

The mode determination module 40 receives as input engine parameters 50 indicating one or more operating conditions of the internal combustion engine 13. The engine parameters 50 can indicate an engine operating mode (e.g., a reduced power mode, or other mode), a particular engine crank position, engine speed, engine torque, gear state, or engine temperature, or any other condition of the engine that may affect engine vibration.

Based on the engine parameters 50, the mode determination module 40 determines an operating mode 52 of the active vibration system 15 to be at least one of a sensing mode and a force generation mode. For example, the mode determination module 40 determines the mode to be the force generation mode based on the engine operating mode. In another example, the mode determination module 40 determines the mode to be the sensing mode when the mode is not the force generation mode and based on particular engine parameters. In yet another example, the mode determination module 40 determines the mode to be the sensing mode when the mode is not the force generation mode and based on periodic time intervals. As can be appreciated, the mode determination module 40 may determine the operating mode 52 based on other conditions and is not limited to the present examples.

The switch control module 44 receives as input the operating mode 52. When the operating mode 52 indicates the sensing mode, the switch control module 44 generates a switch control signal 54 to the switch 32 such that the active vibration system 15 can be operated in a sensing mode. When the operating mode 52 indicates the actuating mode, the switch control module 44 generates a switch control signal 54 to the switch such that the active vibration system 15 can be operated in a force generating mode.

The adaptation module 42 receives as input the operating mode 52. The adaptation module 42 updates the tables stored in the tables datastore 48 based on the operating mode 52. For example, when the operating mode 52 indicates the sensing mode, the adaptation module 42 monitors a current signal 56 received from the active vibration system 15. Substantially simultaneously, the adaptation module 42 monitors engine parameters 58 including, but not limited to, engine speed, engine torque, a gear state, engine temperature, and the crankshaft signal received from the engine control module. The adaptation module 42 determines from the current signal 56 an engine induced vibration level 60 and associates the determined vibration level 60 with the monitored engine speed, engine torque, a gear state, engine temperature, and/or the crankshaft signal. The adaptation module 42 updates the tables of the tables datastore 48 with the determined engine induced vibration level 60 based on the associated engine speed, engine torque, gear state, engine temperature, and/or crankshaft angle. In another example, when the operating mode 52 is the actuation mode, the adaptation module 42 does not update the tables of the tables datastore 48.

The active vibration control module 46 receives as input the operating mode 52. The active vibration control module 46 generates an engine mount control signal 62 to the active vibration system 15 based on the operating mode 52. For example, when the operating mode 52 indicates the sensing mode, no control signal is sent to the active vibration system 15. In another example, when the operating mode 52 indicates the actuation mode, engine parameters 64 are received and a force value 66 is determined from the tables of the tables datastore 48 based on the values of the engine parameters 64 (e.g., by performing a lookup function on the tables to determine a vibration level using the engine parameters and by correlating the vibration level with a force value). The control signal 62 is generated to the active vibration system 15 based on the force value 66 to control the vibration and noise created by the internal combustion engine 13.

Figure 3:
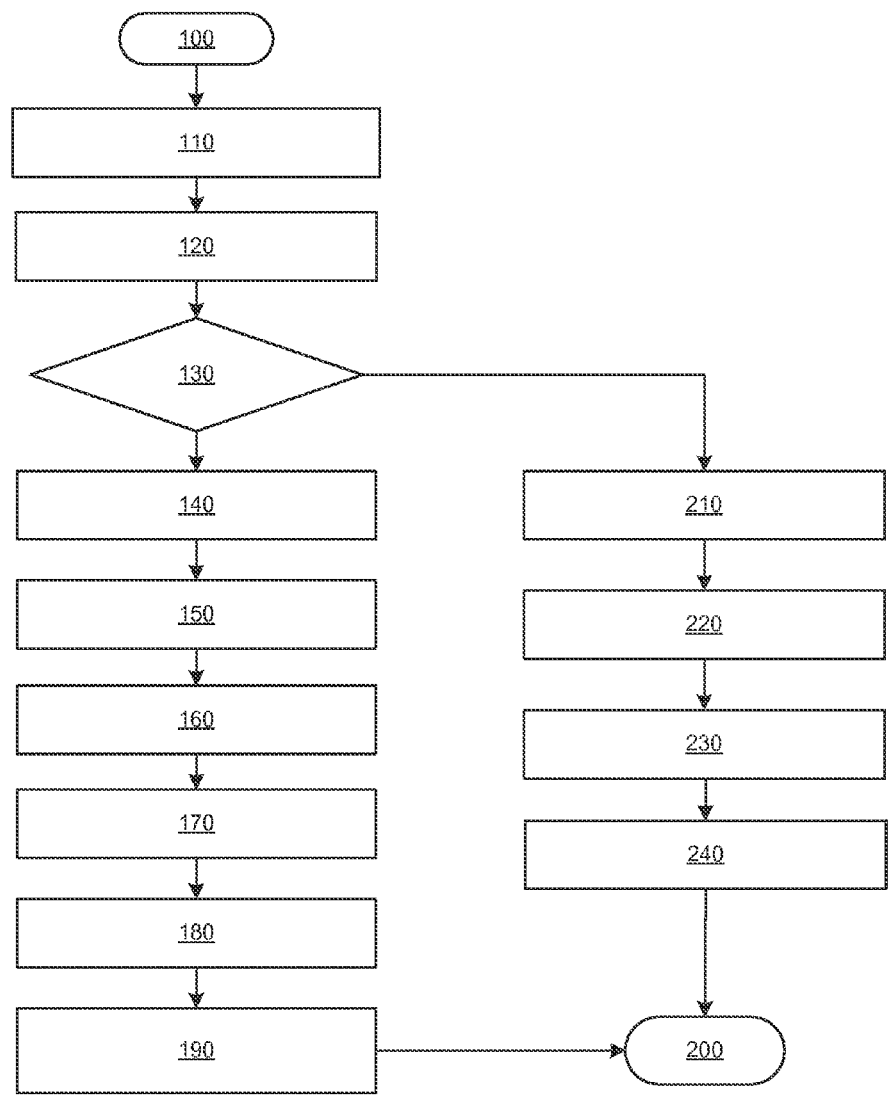
FIG. 3 is a flowchart illustrating a method that may be performed by the engine mount system in accordance with various embodiments.

Referring now to FIG. 3, and with continued reference to FIGS. 1 and 2, a flowchart illustrates an active vibration control method that can be performed by one or more components of the engine mount system 12 of FIGS. 1 and 2 in accordance with various embodiments. As can be appreciated in light of the disclosure, the order of operation within the method is not limited to the sequential execution as illustrated in FIG. 3, but may be performed in one or more varying orders as applicable and in accordance with the present disclosure.

As can further be appreciated, the method of FIG. 3 may be scheduled to run at predetermined time intervals during operation of the vehicle 10 and/or may be scheduled to run based on predetermined events.

In one example, the method may begin at 100. The engine parameters 50 are received at 110. The operating mode 52 is determined based on the engine parameters 50 at 120. If the operating mode 52 is the sensing mode at 130, the method proceeds to step 140. If, however, the operating mode 52 is not the sensing mode, rather the operating mode 52 is the force generation mode at 130, the method proceeds to step 210.

At 140, when in the sensing mode, the switch control signal 54 is generated to activate the switch 32 such that sensing of the active vibration system 15 can occur. The current signal 56 from the active vibration system 15 is monitored at 150. The engine parameters 58 are monitored at 160. The vibration level 60 is determined based on the current signal 56 at 170 and associated with the monitored engine parameters 58 at 180. The tables in the tables datastore 48 are updated based on the determined vibration level 60 and the associated engine parameters 58 at 190. Thereafter, the method may end at 200.

At 210, however, when in the force generation mode, the switch control signal 54 is generated to activate the switch 32 such that force can be generated by the active vibration system 15 to cancel or suppress engine noise and vibration. The engine parameters 64 are monitored at 220. The force value 66 is determined from the tables of the tables datastore 48 based on the engine parameters 64 at 230, and the engine mount control signal 62 is generated based on the force value 66 at 240. Thereafter, the method may end at 200.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling an active vibration system associated with an engine, comprising:
   receiving engine parameters indicating one or more engine operating conditions;
   determining an operating mode of the active vibration system to be one of a sensing mode where the active vibration system operates as a sensor and a force generation mode where the active vibration system operates as a force generator based on the engine parameters; and
   selectively controlling the active vibration system to operate in the determined operating mode.

2. The method of claim 1, wherein the determining comprises determining the operating mode to be the sensing mode and wherein the method further comprises receiving a current signal from the active vibration system in response to the operating mode being the sensing mode.

3. The method of claim 2, further comprising determining a vibration level based on the current signal.

4. The method of claim 3, further comprising updating tables of a datastore based on the vibration level.

5. The method of claim 4, wherein the determining comprises determining the operating mode to be the force generation mode, and wherein the selectively controlling the active vibration system is based on the vibration level of the tables.

6. The method of claim 2, further comprising generating a switch control signal to a switch associated with the active vibration system such that the current signal is received in response to the operating mode being the sensing mode.

7. The method of claim 1, wherein the engine parameters indicate an operating mode of the engine.

8. The method of claim 1, wherein the engine parameters indicate at least one of engine crank position, engine speed, engine torque, gear state, and engine temperature.

9. A engine mount system, comprising:
   an active vibration system;
   a switch associated with the active vibration system; and
   a control module that determines an operating mode of the active vibration system to be one of a sensing mode where the active vibration system operates as a sensor and a force generation mode where the active vibration system operates as a force generator, and that generates a control signal to the switch to operate in the determined operating mode.

10. The engine mount system of claim 9, wherein the control module determines the operating mode to be the sensing mode, and wherein the control module receives a current signal from the active vibration system in response to the operating mode being the sensing mode.

11. The engine mount system of claim 10, wherein the control module determines a vibration level based on the current signal.

12. The engine mount system of claim 11, wherein the control module updates tables of a datastore based on the vibration level.

13. The engine mount system of claim 12, wherein the control module determines the operating mode to be the force generation mode, and wherein the selectively controlling the active vibration system is based on the vibration level of the tables.

14. The engine mount system of claim 10, wherein the control module generates a switch control signal to the switch associated with the active vibration system such that the current signal is received in response to the operating mode being the sensing mode.

15. The engine mount system of claim 9, wherein the control module determines the operating mode based on engine parameters.

16. The engine mount system of claim 15, wherein the engine parameters include at least one of an operating mode of the engine, an engine crank position, an engine speed, an engine torque, a gear state, and an engine temperature.

17. The engine mount system of claim 9, wherein the active vibration system includes an active tuned absorber.

18. The engine mount system of claim 9, wherein the active vibration system includes an active powertrain mount.

19. The engine mount system of claim 9, wherein the switch operates in at least one of a first position and a second position, and when in the first position control signals pass from the control module to the active vibration to energize an actuator of the active vibration system.

20. The engine mount system of claim 19, wherein when in the second position, current signals pass from active vibration system to the control module.

\* \* \* \* \*